(12) United States Patent
Kawano et al.

(10) Patent No.: US 6,441,374 B1
(45) Date of Patent: Aug. 27, 2002

(54) THERMAL TYPE INFRARED RAY DETECTOR WITH THERMAL SEPARATION STRUCTURE FOR HIGH SENSITIVITY

(75) Inventors: Katsuya Kawano; Naoki Oda, both of Tokyo (JP)

(73) Assignee: NEC Corporation, Tokyo (JP)

( * ) Notice: Subject to any disclaimer, the term of this patent is extended or adjusted under 35 U.S.C. 154(b) by 80 days.

(21) Appl. No.: 09/621,854

(22) Filed: Jul. 24, 2000

(30) Foreign Application Priority Data

Jul. 26, 1999 (JP) ........................................... 11-210339
Nov. 25, 1999 (JP) ........................................... 11-334049

(51) Int. Cl.[7] ................................................. G01J 5/00
(52) U.S. Cl. ................................ 250/338.1; 250/338.2; 250/338.3; 250/338.4
(58) Field of Search ........................... 250/338.1, 338.2, 250/338.4, 338.3

(56) References Cited

U.S. PATENT DOCUMENTS

| 5,099,120 A | * | 3/1992 | Turnbull .................. 250/338.2 |
| 5,602,043 A | | 2/1997 | Beratan et al. ............... 438/54 |
| 5,641,709 A | | 6/1997 | Lee ............................... 438/3 |
| 5,688,699 A | | 11/1997 | Cunningham et al. ........ 438/54 |
| RE36,706 E | * | 5/2000 | Cole ........................... 250/349 |
| 2001/0010360 A1 | * | 8/2001 | Oda ........................ 250/338.1 |

FOREIGN PATENT DOCUMENTS

| JP | 10-19671 | 1/1998 |
| JP | 2834202 | 10/1998 |
| JP | 10-332480 | 12/1998 |

OTHER PUBLICATIONS

"Monolithic Silicon Microbolometer Arrays" in "Uncooled Infrared Imaging Arrays and Systems" by R.A. Wood (Semiconductors and Semimetals, vol. 47 vol. editors P.W. Kuruse and D.D. Skatrud, Academic Press 1997, p. 103).
"Fabrication Process for 256×256 Bolometer–Type Uncooled Infrared Detector" by H. Wada et al. (SPIE vol. 3379, 1997, p. 40).
"Advances in monolithic ferroelectric uncooled IRFPA technology" by Hanson, et al., (SPIE vol. 3379, 1998, p. 60).

* cited by examiner

Primary Examiner—Georgia Epps
Assistant Examiner—M. Hasan
(74) Attorney, Agent, or Firm—Scully, Scott, Murphy & Presser

(57) ABSTRACT

A thermal type infrared ray detector with a thermal separation structure includes a plurality of picture elements. Each of the plurality of picture elements includes a circuit formed in a substrate for every picture element, and a light receiving section converting infrared rays into change of a resistance or a charge quantity. The circuit generates a voltage signal from the resistance change or the charge quantity change. Beams mechanically support the light receiving section from the substrate to form a gap between the light receiving section and the substrate, and electrically connect the light receiving section to the circuit. Each of the beams includes a wiring line film formed of Ti alloy and connecting the light receiving section to the circuit, and a protective insulating film surrounding the wiring line film. In this case, the Ti alloy may be TiAl6V4.

34 Claims, 13 Drawing Sheets

Fig. 12

TABLE 1. THERMAL CONDUCTIVITY OF WIRING LINE MATERIAL

| WIRING LINE MATERIAL | THERMAL CONDUCTIVITY (W/cmK) | REFERENCES |
|---|---|---|
| PLATINUM (Pt) | 0.72 | CRC Handbook of Chem. & Phys. 66th ed. D-185, E-13 |
| NICKEL (Ni) | 0.90 | Landolt - Börnstein New Series III/15c, p36 |
| CHROME (Cr) 500A | 0.29 | R. A. Wood, Uncooled Infrared Imaging Arrays and Systems, "Semiconductors and Semimetals" Vol. 47, p99 |
| TITANIUM (Ti) | 0.22 | CRC Handbook of Chem. & Phys. 66th ed. D-185, E-14 |
| NiCr | 0.13 | PHYSICAL DATA LIST (1988) PHYSICS 59 (479) |
| Ti ALLOY 1 (TiAl6 V4) | 0.065 | Landolt - Börnstein New Series III/15c, p328 |
| Ti ALLOY 2 (VT-3) | 0.072 | Landolt - Börnstein New Series III/15c, p326 |
| Ti ALLOY 3 (VT-5) | 0.078 | Landolt - Börnstein New Series III/15c, p326 |
| Ti ALLOY 4 (VT-14) | 0.074 | Landolt - Börnstein New Series III/15c, p326 |
| Ti ALLOY 5 (4Al-3Mo-1V) | 0.0833 | Landolt - Börnstein New Series III/15c, p327 |
| Ti ALLOY 6 (6Al-4V) | 0.0751 | Landolt - Börnstein New Series III/15c, p327 |
| Ti ALLOY 7 (Ti-A110 AT) | 0.0817 | Landolt - Börnstein New Series III/15c, p327 |
| Ti ALLOY 8 (Ti-V-X) | 0.087 | Landolt - Börnstein New Series III/15c, p329 |
| Ti ALLOY 9 (Ti-V-X) | 0.08 | Landolt - Börnstein New Series III/15c, p329 |

Fig. 13

TABLE 2. Gth OF BEAM OF WIRING LINE MATERIAL AND RELATIVE SENSITIVITY
(1 IN CASE OF NiCr)

WIRING LINE MATERIAL: LENGTH 29 μm, WIDTH 1 μm, THICKNESS 100nm, 2
STRUCTURAL MATERIAL (SiN): LENGTH 29 μm, WIDTH 1.8 μm, THICKNESS 600nm, 2

| WIRING LINE MATERIAL | Gth (μW/K) | RELATIVE SENSITIVITY |
|---|---|---|
| Ti | 0.209 | 0.6 |
| NiCr | 0.126 | 1 |
| Ti ALLOY 1 (TiAl6 V4) | 0.102 | 1.24 |
| Ti ALLOY 2 (VT-3) | 0.107 | 1.18 |
| Ti ALLOY 3 (VT-5) | 0.111 | 1.14 |
| Ti ALLOY 4 (VT-14) | 0.108 | 1.17 |
| Ti ALLOY 5 (4Al-3Mo-1V) | 0.115 | 1.10 |
| Ti ALLOY 6 (6Al-4V) | 0.109 | 1.16 |
| Ti ALLOY 7 (Ti-Al10 AT) | 0.113 | 1.11 |
| Ti ALLOY 8 (Ti-V-X) | 0.117 | 1.08 |
| Ti ALLOY 9 (Ti-V-X) | 0.112 | 1.12 |

Fig. 14

TABLE 3. CONTAINING PERCENTAGES OF COMPOSITION OF Ti ALLOY

| | CONTAINING PERCENTAGES (%) | | | | | | | | |
|---|---|---|---|---|---|---|---|---|---|
| | Ti | Al | V | Mo | Cr | Sn | Fe | Si | OTHER |
| Ti ALLOY 1 (TiAl6 V4) | 89.6 | 6.1 | 4 | – | | – | 0.13 | – | 0.21 |
| Ti ALLOY 2 (VT-3) | 90.3 | 5.5 | – | 1.97 | 1.72 | | 0.19 | 0.24 | 0.08 |
| Ti ALLOY 3 (VT-5) | 91.9 | 5.47 | – | – | – | 2.5 | 0.11 | 0.03 | 0.04 |
| Ti ALLOY 4 (VT-14) | 89.6 | 5.4 | 1.3 | 3.4 | – | – | 0.19 | 0.07 | 0.05 |
| Ti ALLOY 5 (4Al-3Mo-1V) | 91.5 | 4.4 | 1 | 3 | – | – | 0.1 | – | 0.05 |
| Ti ALLOY 6 (6Al-4V) | 90.1 | 5.89 | 3.87 | – | – | – | 0.15 | – | 0.04 |
| Ti ALLOY 7 (Ti-Al10 AT) | 91.5 | 5.5 | – | – | – | 2.5 | 0.2 | – | – |
| Ti ALLOY 8 (Ti-V-X) | 82 | 2.75 | 14.95 | – | – | – | 0.21 | – | 0.05 |
| Ti ALLOY 9 (Ti-V-X) | 71.9 | 3.5 | 13.9 | – | 10.4 | – | 0.25 | – | 0.08 |

THERMAL TYPE INFRARED RAY DETECTOR WITH THERMAL SEPARATION STRUCTURE FOR HIGH SENSITIVITY

BACKGROUND OF THE INVENTION

1. Field of the Invention

The present invention relates to thermal type infrared ray detector with a thermal separation structure.

2. Description of the Related Art

As an infrared ray detecting device, a detecting device of a thermal separation structure is known as "Monolithic Silicon Micro-bolometer Arrays" in "Uncooled Infrared Imaging Arrays and Systems" by R. A. Wood, (Semiconductors and Semimetals, Volume 47, volume editors P. W. Kruse and D. D. Skatrud, Academic Press, 1997, p103). FIGS. 1 and 2 show such a thermal separation structure of a picture element of a bolometer type uncooled infrared sensor array. As shown in FIGS. 1 and 2, a readout circuit 102 for bolometer is formed in a Si substrate 101, and a diaphragm 105 is supported by two beams 104 to form an air gap 103 between a semiconductor 101 and the diaphragm 105. The structure material of the beam 104 is a protective insulating film 106 of silicon nitride and the thickness of a wiring line film which is formed of NiCr on the beam 104 is 50 nm. The diaphragm 105 as a light receiving section is composed of a thin film 107 of vanadium oxide with the resistance of 20 kΩ as a bolometer material and a protective insulating film 106 of silicon nitride with the thickness of 800 nm. A full reflection film 108 is formed on the surface of the readout circuit 102 through the protective insulating film.

When infrared rays 109 are incident on the diaphragm 105 in such a thermal separation structure, the infrared rays 109 are absorbed by the silicon nitride thin film 106. A part of the infrared rays 109 passes through the diaphragm 105 and then is reflected to the direction of the diaphragm 105 by the reflection film 108. Thus, the reflected infrared rays are absorbed once again by the silicon nitride thin film 106. In this way, the infrared rays are absorbed so that the temperature of the diaphragm 105 changes. The resistance of the bolometer thin film 107 changes through the change of the temperature, and is converted into a voltage change by the readout circuit. Thus, an infrared picture is obtained.

Also, as the infrared ray detecting device, a bolometer type noncooled infrared sensor array by H. Wada et al., (SPIE Vol. 3224, 1997, p40) is known. FIGS. 7 and 8 show a thermal separation structure of a picture element of the bolometer type noncooled infrared sensor array. FIG. 3 is a plan view showing the picture element, and FIG. 4 is a sectional view of the picture element along a broken line shown by a point line of A1-A2-A3-A4-A5-A6-A7-A8-A9-A10. A diaphragm 113 is supported by two beams 112 to form an air gap between the diaphragm 113 and a silicon substrate 111 with a readout circuit. The structure material of the beam 112 is a protective insulating film 114 of silicon nitride, and a wiring line material 115 of the beam 112 is a Ti film having the thickness of 100 nm. The diaphragm 113 as a light receiving section is formed of a vanadium oxide thin film 116 with the sheet resistance of 10 to 30 kΩ/sq as bolometer material, an protective insulating film 117 of silicon nitride with the thickness of 400 nm and an infrared absorption film 118 of TiN thin film with the thickness of 15 nm.

The wiring line 115 on the beam 112 is connected with the readout circuit in the silicon substrate 111 by wiring line plugs 121 through a contact 120 provided in a bank section 119. Also, a reflection film 122 of a WSi film with the thickness of 20 nm and a protective insulating film 123 are formed on the silicon substrate through a thermal oxidation film.

The distance between the reflection film 122 and the infrared absorption film 118 is adjusted to $1/(4n)$ of the wavelength of an infrared ray to be detected (n is effective refractive index). The infrared rays are absorbed by the infrared absorption film 118. A part of the infrared rays passes through the infrared absorption film 118, and then are reflected by the reflection film 122 to the direction of the diaphragm 113. In the diaphragm 113, the infrared rays interfere with each other so that a component of the infrared rays with the wavelength to be detected is absorbed by the infrared absorption film 118. Thus, change of the temperature of the diaphragm is caused. The resistance of the bolometer thin film 116 changes through the change of the temperature, and the change of the resistance is converted into a voltage change by the readout circuit. In this way, an infrared picture is obtained.

Also, as the infrared ray detecting device, a micro-bolometer array by Cunningham et al., (U.S. Pat. No. 5,688,699) is known. FIG. 5 shows a thermal separation structure of a picture element of the micro-bolometer array. As shown in FIG. 5, an epitaxial layer 131 is grown on a silicon substrate 130, and a readout circuit for the bolometer is formed in the epitaxial layer 131. A diaphragm 133 is provided above the epitaxial layer 131 and is supported by two beams 132 and 132' to form an air gap between the diaphragm 133 and the epitaxial layer 131.

The structure material of the beam 132 or 132' is silicon nitride 134, and a wiring line 135 on the beam 132 or 132' is formed of a Cr film with the thickness of 10 nm and a Ni film with the thickness of 20 nm. The diaphragm 133 as a light receiving section is formed of a vanadium oxide thin film 136 of bolometer material with the sheet resistance of 15 to 30 kΩ. Also, the diaphragm 133 is further composed of a protective insulating film 137 of silicon nitride with the thickness of 100 nm and an infrared absorption film of a gold thin film having the thickness of 10 nm. In FIG. 5, the absorption film is not shown.

The diaphragm 133 and wiring line films are electrically connected by contact sections 138a and 138b formed of the bolometer material. Also, the wiring line films and the readout circuit in the epitaxial layer are electrically connected by a contact 139. Also, the epitaxial layer 131 is covered by a $SiO_2$ protective insulating film 140 and a reflection film composed of a Pt film with the thickness of 50 nm and a Cr film with the thickness of 5 nm. In FIG. 5, a reflection film is not shown.

The distance between the reflection film and the infrared absorption film is adjusted to ¼n of a detection wavelength (n: effective refractive index). The infrared rays absorbed by the infrared absorption film and the infrared rays passing through the infrared absorption film and then reflected by the reflection film to the direction of the diaphragm interfere with each other. As a result, the infrared rays with the detection wavelength are absorbed by the infrared absorption film, so that the temperature of the diaphragm changes. The resistance of the bolometer thin film changes through the change of the temperature, and the change of the resistance is converted into a voltage change by the readout circuit. In this way, an infrared picture is obtained.

Also, as the infrared ray detecting device, a pyroelectric-type array by Hanson et al., (SPIE vol. 3379, 1998, p60) is known. FIGS. 6 and 7 are a thermal separation structure of a picture element of the pyroelectric type array. As shown in FIGS. 6 and 7, a diaphragm 152 is supported by two beams 151 to form an air gap' between the diaphragm 152 and a silicon substrate 150 with a readout circuit. The diaphragm 152 is composed of a lower electrode 153 of Pt/Ti, a pyroelectric thin film 154 of $(Pb,La)(Zr,Ti)O_3$ with the thickness of 250 to 350 nm on the electrode 153 and an upper electrode 155 of a Nickel-Chrome thin film. One of the two beams 151 is composed of the lower electrode 153 and the pyroelectric thin film 154, and the other beam 151 is composed of the pyroelectric thin film 154 and the upper electrode 155. The thermal conduction of such a well known thermal separation structure of is determined based on Pt of the lower electrode.

The upper electrode and the lower electrode are connected with the readout circuit in the silicon substrate 150 through contacts 156. The infrared rays are incident on the diaphragm 152, and interfere between the upper electrode and the lower electrode to cancel each other. As a result, the infrared rays with a specific wavelength are absorbed by the upper electrode, so that the temperature of the diaphragm changes. The surface electric charge quantity of the pyroelectric thin film 154 changes in accordance with the change of the temperature and the change of the charge quantity is converted into a voltage change by the readout circuit. In this way, an infrared picture is obtained.

The fact will be considered that the sensitivity of the thermal type infrared sensor of the above conventional examples is proportional to a fill factor. The fill factor is the ratio of the diaphragm as a light receiving section to a picture element. The wiring lines such as a signal line extend on a bank section 119 in the conventional example shown in FIGS. 3 and 4. Therefore, the fill factor of the diaphragm as the light receiving section can not be made large in the conventional example. For this reason, it is desirable that these wiring lines are arranged under the diaphragm to improve the sensitivity of the detector.

Also, the factor will be considered that the sensitivity of the conventional example of the thermal type infrared sensor is inversely proportional to a thermal conductance to be described later. The wiring line material and the structure material of the beam in the above four conventional examples are as follows: a NiCr film with the thickness of 800 nm and a silicon nitride thin film having the thickness of 50 nm in FIGS. 1 and 2; a Ti film with the thickness of 100 nm and the multiple thin film of silicon nitride and silicon oxide the total thickness of about 600 nm in FIGS. 3 and 4; a layer structure wiring line of a Cr film with the thickness of 10 nm and a Ni film with the thickness of 20 nm and the silicon nitride film in FIG. 5; and one of the beams composed of the Ti and Pt thin film and the ferroelectric thin film of 30 to 60 nm, and the other beam is composed of NiCr thin film and a ferroelectric thin film in FIGS. 6 and 7. In case of FIGS. 6 and 7, the thermal conductance is determined depending on the Pt thin film. Therefore, it is desired to select an optimal material for the wiring line material to improve the sensitivity of the detector.

In conjunction with the above description, a thermal type infrared ray sensor is disclosed in Japanese Laid Open Patent Application (JP-A-Heisei 10-19671). In this reference, the infrared sensor 20 formed above a semiconductor substrate 1 is composed of an infrared light receiving section 21 and bridge sections 24. The infrared light receiving section 21 converts incident infrared rays into a thermal energy and electrically outputs the physical value changing in accordance with the converted thermal energy. A wiring line layer 24A is provided for the bridge section 24 to electrically connect the infrared light receiving section and the semiconductor substrate 1. At least one the above infrared light receiving section 21 and the bridge section 24 is supported by insulative leg sections 25, 26 and 27. The reduction of thermal conductance between the infrared light receiving section 21 and/or the bridge section 24 and the semiconductor substrate 1 is attempted.

Also, an infrared solid imaging device is disclosed in Japanese Laid Open Patent Application (JP-A-Heisei 10-332480). In this reference, in a 2-dimensional infrared ray solid imaging device using a thermal infrared ray detector, a thermal type light detector section is supported on a semiconductor substrate by support legs with large thermal resistance. The temperature change of the thermal type detector section on the incidence of infrared rays is detected through the wiring lines in the support leg. A plurality of wiring lines are arranged in parallel or laminated in at least one support leg.

Also, an infrared detector is disclosed in Japanese Patent No. 2,834,202 corresponding to U.S. patent application No. 231,797 filed on Aug. 12, 1988. In this reference, a bolometer array for detecting radiation in an infrared spectrum range is composed of a substrate including an array of bolometer circuit element sets in the neighborhood of the surface of the substrate. An array of resistances is distanced from the surface by ¼ of the wavelength in the center of the infrared ray radiation spectral range. Each of the resistances and leads of the resistances is composed of a stack, which includes a first conductive layer, a resistance layer and a second conductive layer. The second conductive layer is the nearest the surface. Each of the resistances is oriented to receive the radiation, and provided above a corresponding one of the bolometer circuit sets to be electrically connected with the corresponding. bolometer circuit set. The sheet resistances of the first conductive layer and the second conductive layer causes at least 50% of absorption in the said spectral range. Also, the bolometer array includes a chopper for chopping the radiation to the said resistance. The second conductive layer has an inactive layer, and the surface is reflective. The space between the surface and the inactive layer is exhausted. The stack contains a first inactive layer on the first conductive layer and a second inactive layer on the second conductive layer. The first inactive layer and the second inactive layer are formed of silicon dioxide. The first conductive layer and the second conductive layer are formed of titanium nitride. The resistance layer is formed of amorphous silicon.

SUMMARY OF THE INVENTION

Therefore, an object of the present invention is to provide a thermal type infrared ray detector with a thermal separation structure, in which a fill factor can be increased.

Another object of the present invention is to provide a thermal type infrared ray detector with a thermal separation structure, in which a wiring line is arranged under a diaphragm.

Still another object of the present invention is to provide a thermal type infrared ray detector with a thermal separation structure, in which the sensitivity of the detector can be improved by selecting an optimal material.

In order to achieve an aspect of the present invention, a thermal type infrared ray detector with a thermal separation structure includes a plurality of picture elements, each of which includes a circuit formed in a substrate for every picture element, and a light receiving section converting infrared rays into change of a resistance or a charge quantity.

The circuit generates a voltage signal from the resistance change or the charge quantity change. Beams mechanically support the light receiving section from the substrate to form a gap between the light receiving section and the substrate, and electrically connect the light receiving section to the circuit. Each of the beams includes a wiring line film formed of Ti alloy and connecting the light receiving section to the circuit, and a protective insulating film surrounding the wiring line film. In this case, the Ti alloy may be TiAl6V4.

Also, the light receiving section may be connected to the circuit via contact pads. In this case, it is desirable that the contact pad for a first of the plurality of picture elements and the contact pad of a second of the plurality of picture elements which is disposed in a diagonal direction from the first picture element are structurally unified and electrically insulated.

Also, it is desirable that a signal line for transferring the voltage signal to the circuit and a ground line are formed in the substrate.

Also, the thermal type infrared ray detector may further include a reflecting film formed on the substrate to perfectly reflect the infrared ray which has passed through the light receiving section, toward the light receiving section.

Also, the converting film may include a bolometer material film. In this case, the light receiving section may further include a protective insulating film formed to cover the bolometer material film.

Instead, the light receiving section may include a lower electrode, a ferroelectric material thin film formed on the lower electrode, and an upper electrode formed on the ferroelectric material thin film. In this case, the light receiving section may further include a protective insulating film formed to cover the upper electrode.

In order to achieve another aspect of the present invention, a thermal type infrared ray detector with a thermal separation structure includes a plurality of picture elements, each of which includes a circuit formed in a substrate for every picture element, and a light receiving section converting infrared rays into change of a resistance or a charge quantity. The circuit generates a voltage signal from the resistance change or the charge quantity change. Beams mechanically support the light receiving section from the substrate to form a gap between the light receiving section and the substrate, and electrically connect the light receiving section to the circuit. Each of the beams includes a wiring line film formed of Ti alloy and connecting the light receiving section to the circuit, and a protective insulating film surrounding the wiring line film. Also, a signal line for transferring the voltage signal to the circuit and a ground line are formed in the substrate. In this case, it is desirable that the Ti alloy is TiAl6V4.

Also, the light receiving section may be connected to the circuit via contact pads. In this case, it is desirable that the contact pad for a first of the plurality of picture elements and the contact pad of a second of the plurality of picture elements which is disposed in a diagonal direction from the first picture element are structurally unified and electrically insulated.

Also, the thermal type infrared ray detector may further include a reflecting film formed on the substrate to perfectly the infrared ray which has passed through the light receiving section, toward the light receiving section.

Also, the converting film may include a bolometer material film. In this case, the light receiving section may further include a protective insulating film formed to cover the bolometer material film.

Instead, the light receiving section may include a lower electrode, a ferroelectric material thin film formed on the lower electrode, and an upper electrode formed on the ferroelectric material thin film. In this case, the light receiving section may further include a protective insulating film formed to cover the upper electrode.

In order to achieve still another aspect of the present invention, a thermal type infrared ray detector with a thermal separation structure includes a plurality of picture elements, each of which includes a circuit formed in a substrate for every picture element, and a light receiving section converting infrared rays into change of a resistance or a charge quantity. The circuit generates a voltage signal from the resistance change or the charge quantity change. Beams mechanically support the light receiving section from the substrate to form a gap between the light receiving section and the substrate, and electrically connecting the light receiving section to the circuit via contact pads. Each of the beams includes a wiring line film formed of Ti alloy and connecting the light receiving section to the circuit, and a protective insulating film surrounding the wiring line film. The contact pad for a first of the plurality of picture elements and the contact pad of a second of the plurality of picture elements which is disposed in a diagonal direction from the first picture element are structurally unified and electrically insulated. In this case, it is desirable that the Ti alloy is TiAl6V4.

Also, it is desirable that a signal line for transferring the voltage signal to the circuit and a ground line are formed in the substrate.

Also, the thermal type infrared ray detector may further include a reflecting film formed on the substrate to perfectly reflect the infrared ray which has passed through the light receiving section, toward the light receiving section.

Also, the converting film may include a bolometer material film. In this case, the light receiving section may further include a protective insulating film formed to cover the bolometer material film.

Instead, the light receiving section may include a lower electrode, a ferroelectric material thin film formed on the lower electrode, and an upper electrode formed on the ferroelectric material thin film. In this case, the light receiving section may further include a protective insulating film formed to cover the upper electrode.

BRIEF DESCRIPTION OF THE DRAWINGS

FIG. 12 is a table indicating thermal conductivity of the metal material;

FIG. 13 is a table indicating Gth of the metal material and the relative sensitivity; and FIG. 14 is a table indicating the containing percentage of various Ti alloys.

DESCRIPTION OF THE PREFERRED EMBODIMENTS

Hereinafter, a thermal type infrared ray detector with a thermal separation structure of the present invention will be described below in detail with reference to the attached drawings.

Figure 1:
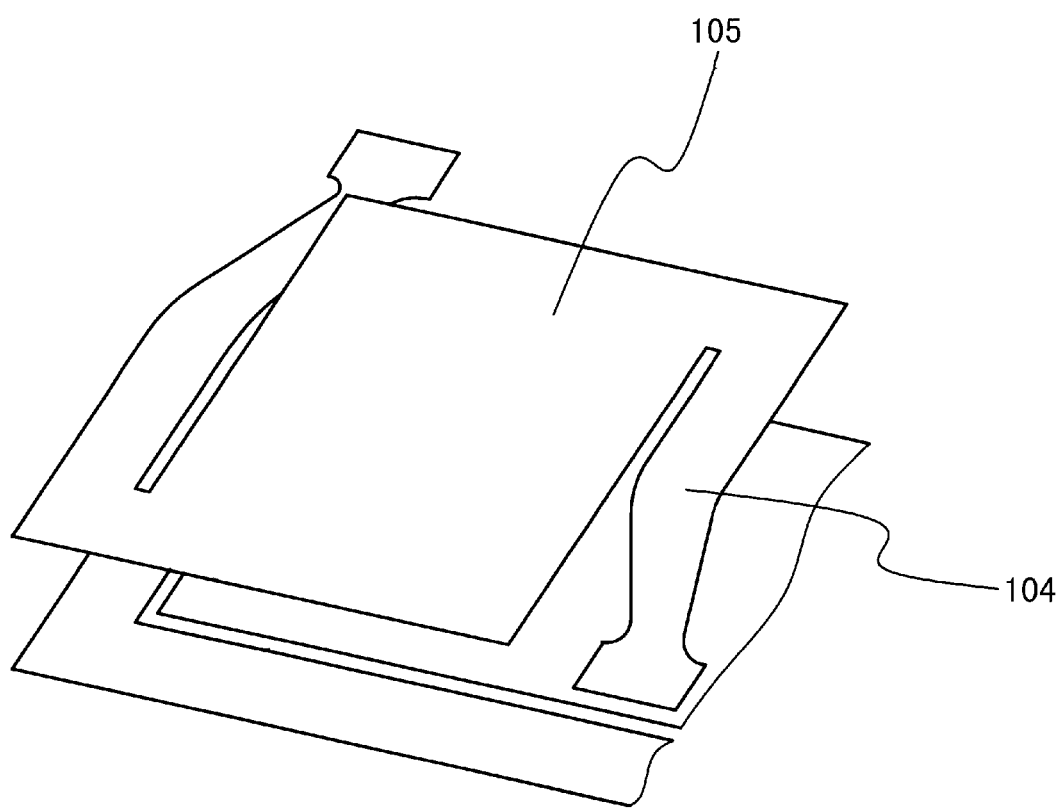
FIG. 1 is a perspective view of a first conventional example of a thermal type infrared ray-type detector.
Figure 2:
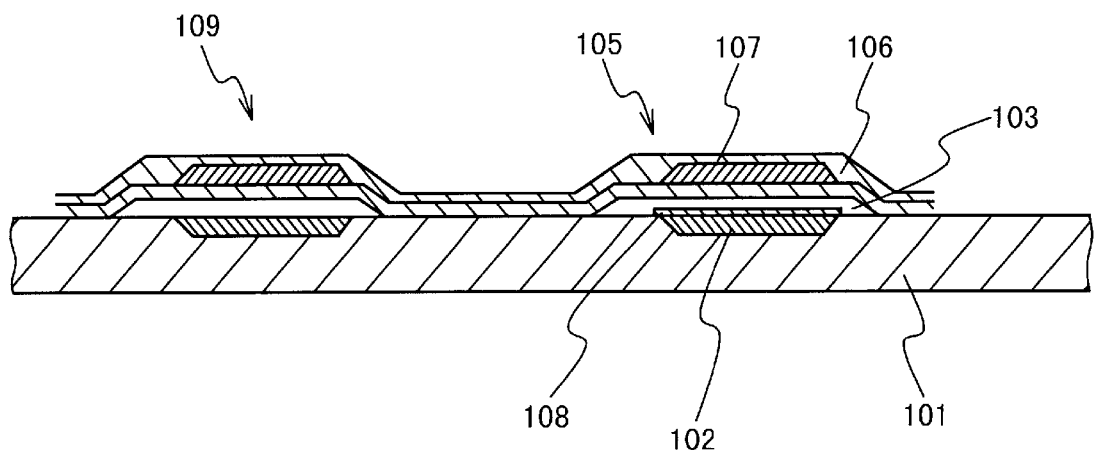
FIG. 2 is a front cross sectional view of the first conventional example of a thermal type infrared ray-type detector.
Figure 3:
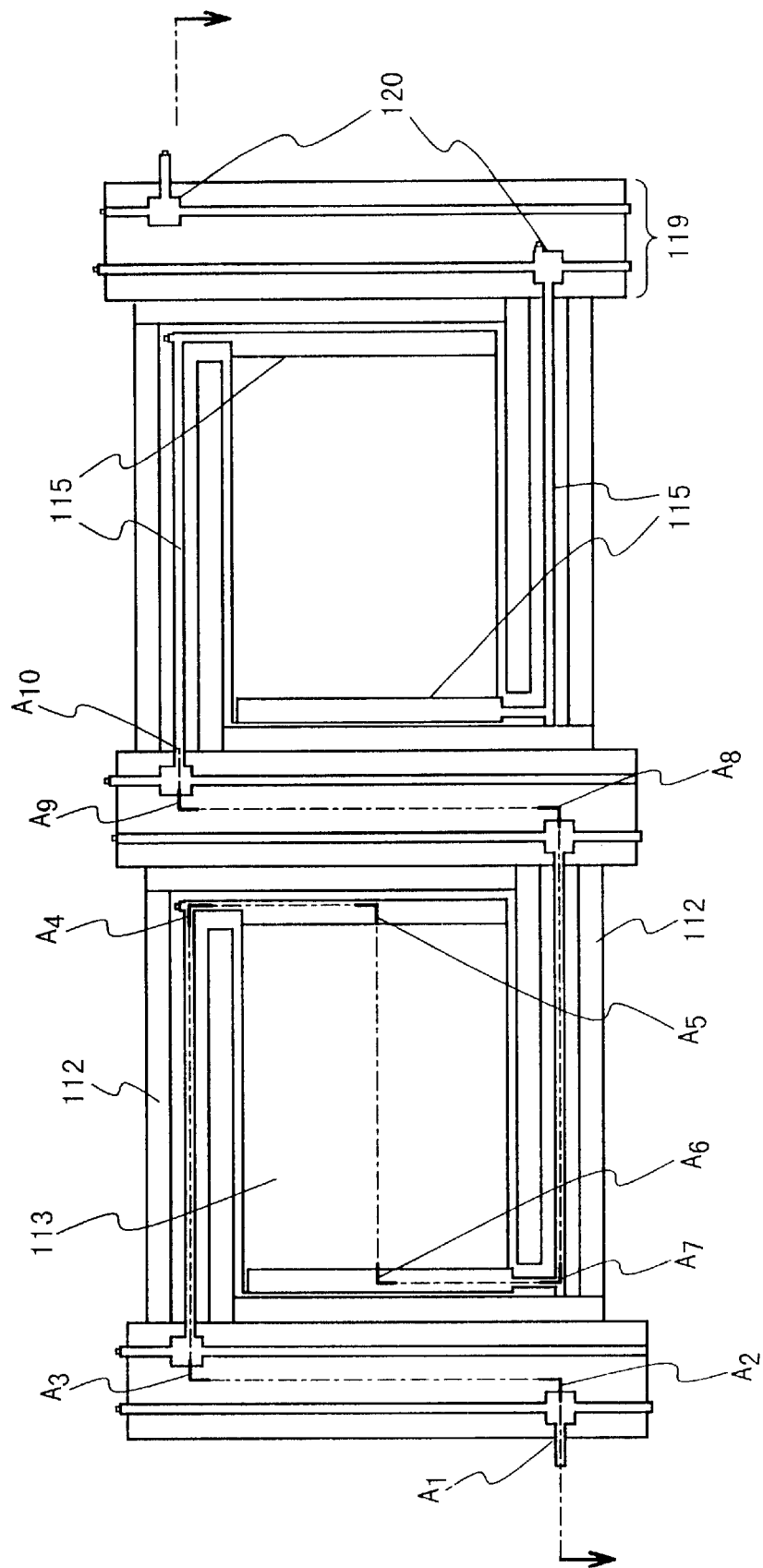
FIG. 3 is a plan view of a second conventional example of the thermal type infrared ray-type detector.
Figure 4:
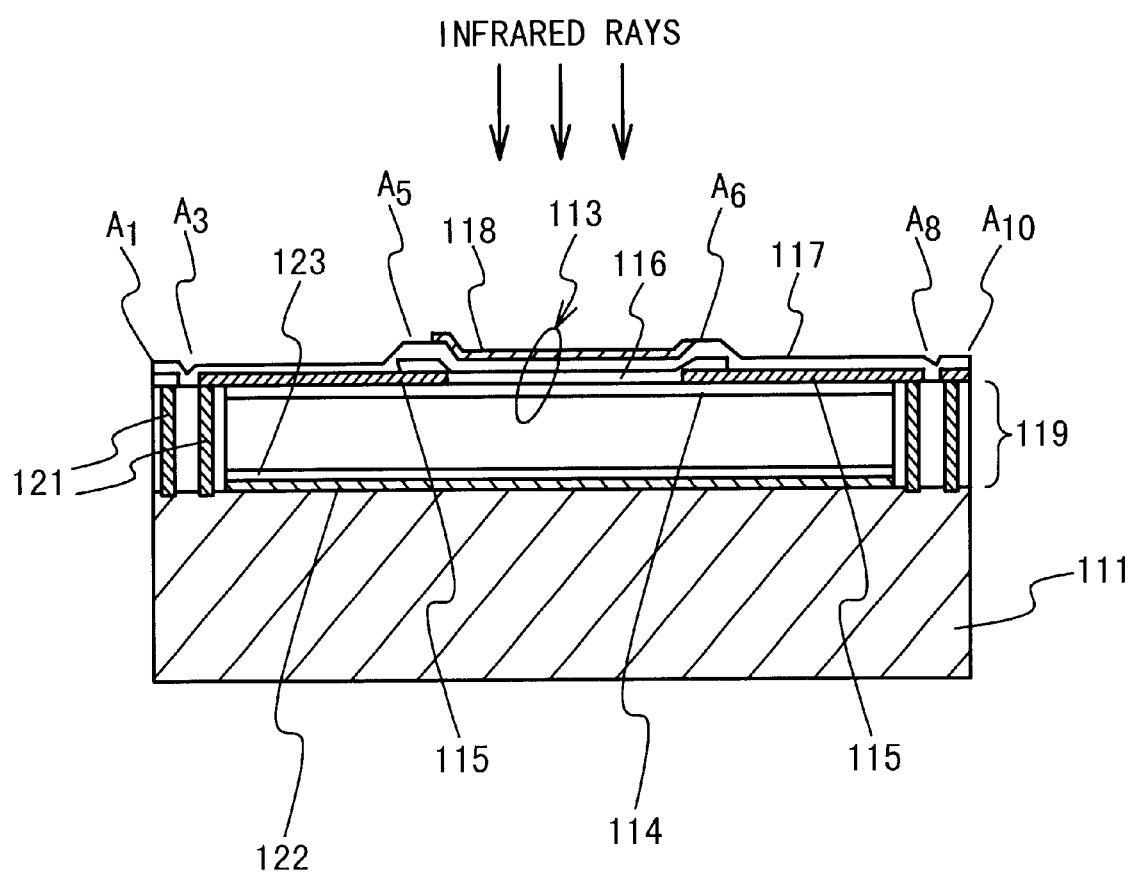
FIG. 4 is a cross sectional view of the second conventional example of the thermal type infrared ray-type detector along an A1 to A10 line of FIG. 3.
Figure 5:
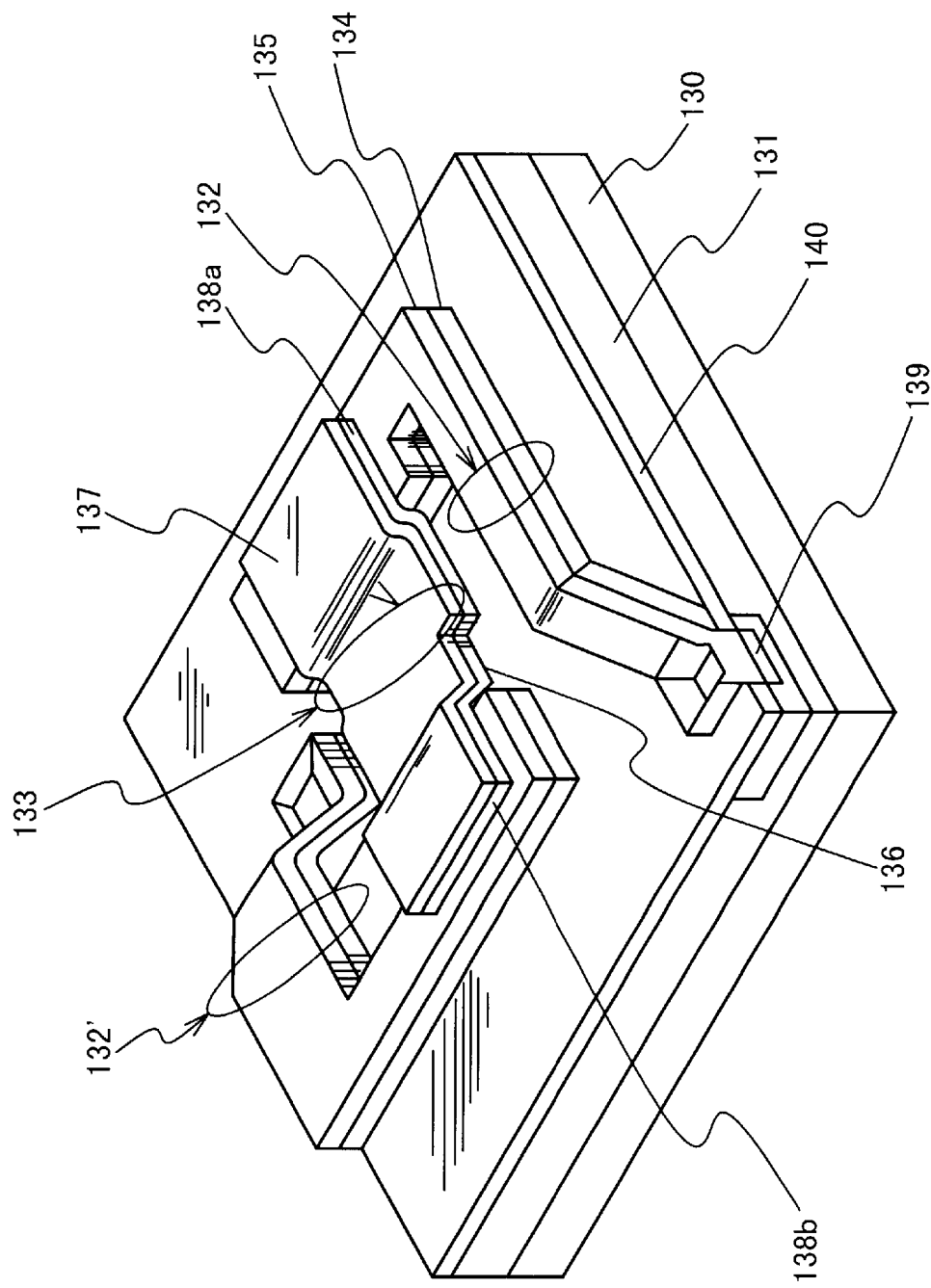
FIG. 5 is a perspective view of a third conventional example of the thermal type infrared ray-type detector.
Figure 6:
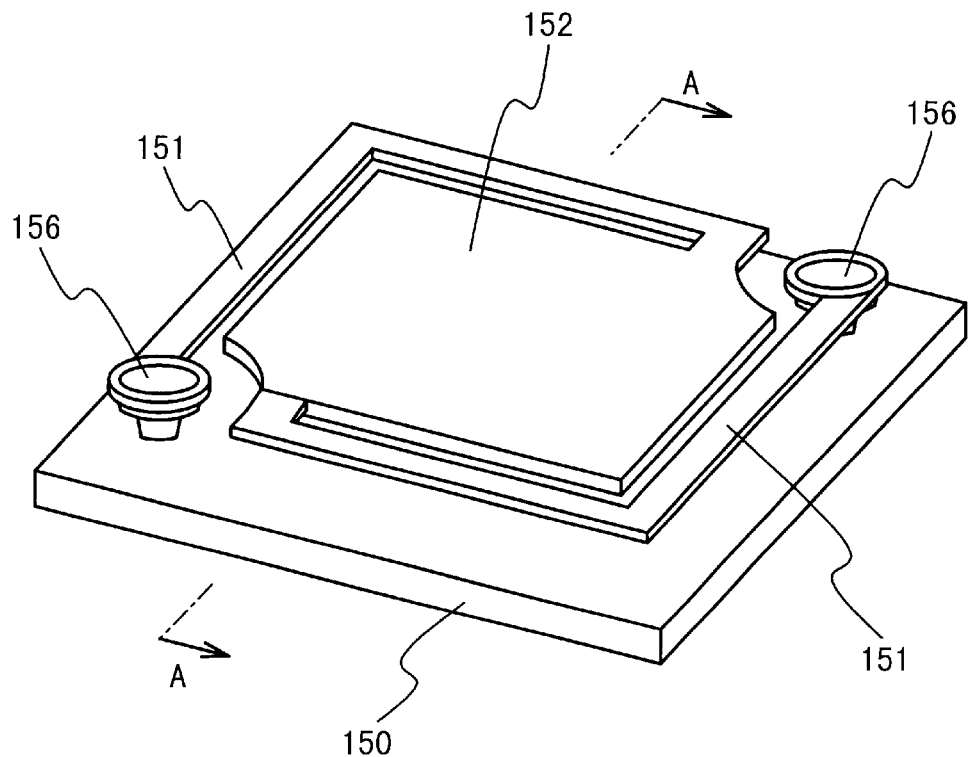
FIG. 6 is a perspective view of a fourth conventional example of the thermal type infrared ray-type detector.
Figure 7:
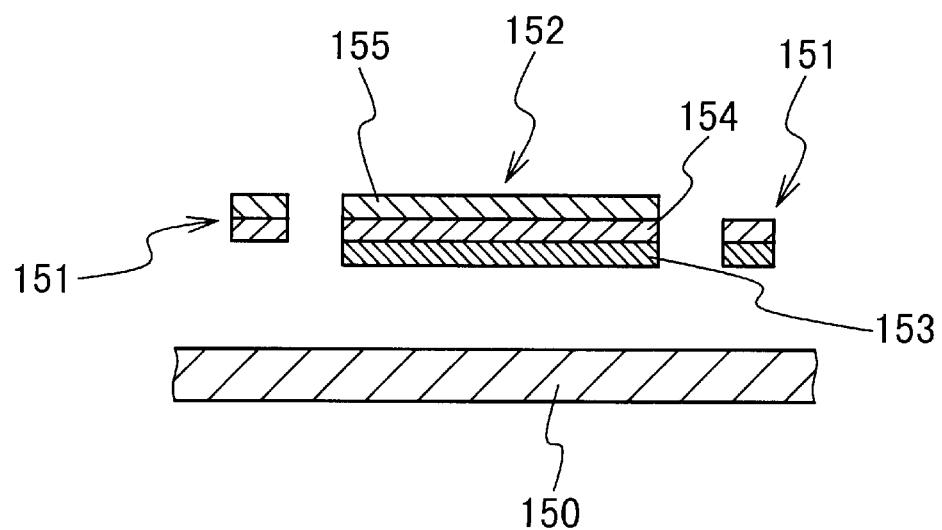
FIG. 7 is a cross sectional view of the fourth conventional example of the thermal type infrared ray-type detector along an A—A line of FIG. 6.
Figure 8:
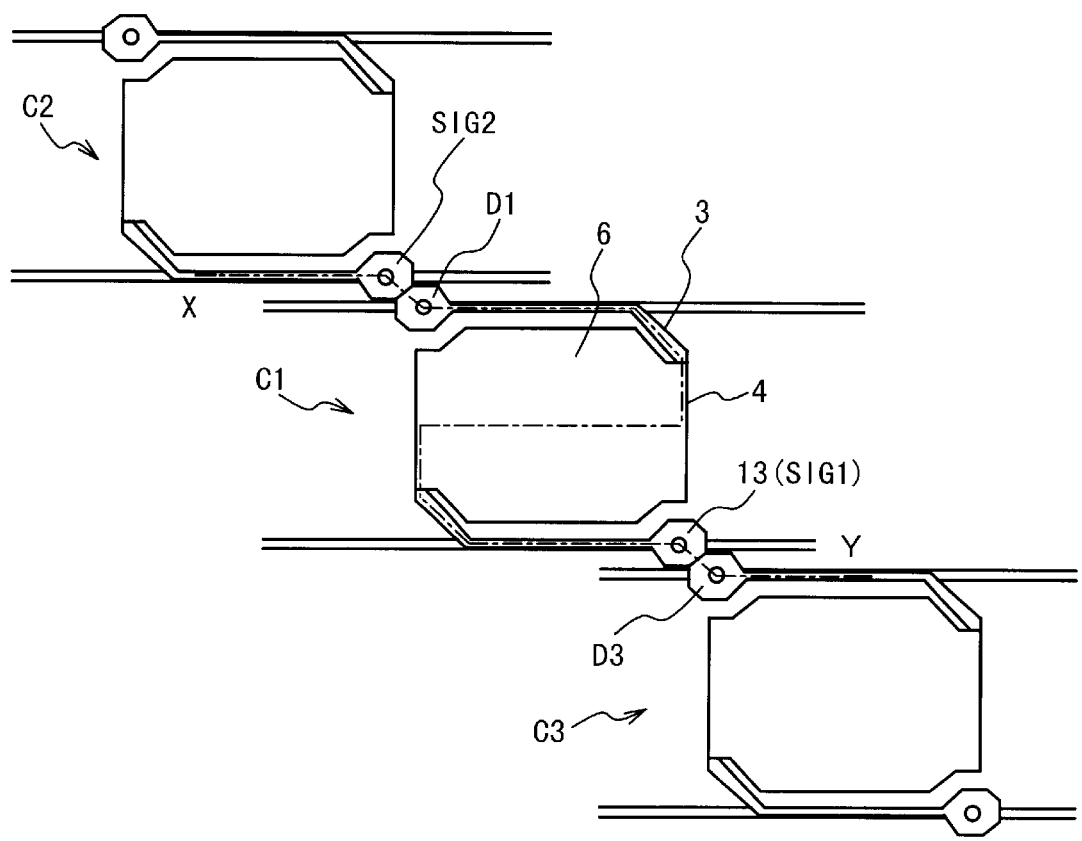
FIG. 8 is a plan view showing a thermal type infrared ray detector with a thermal separation structure according to a first embodiment of the present invention.
Figure 9:
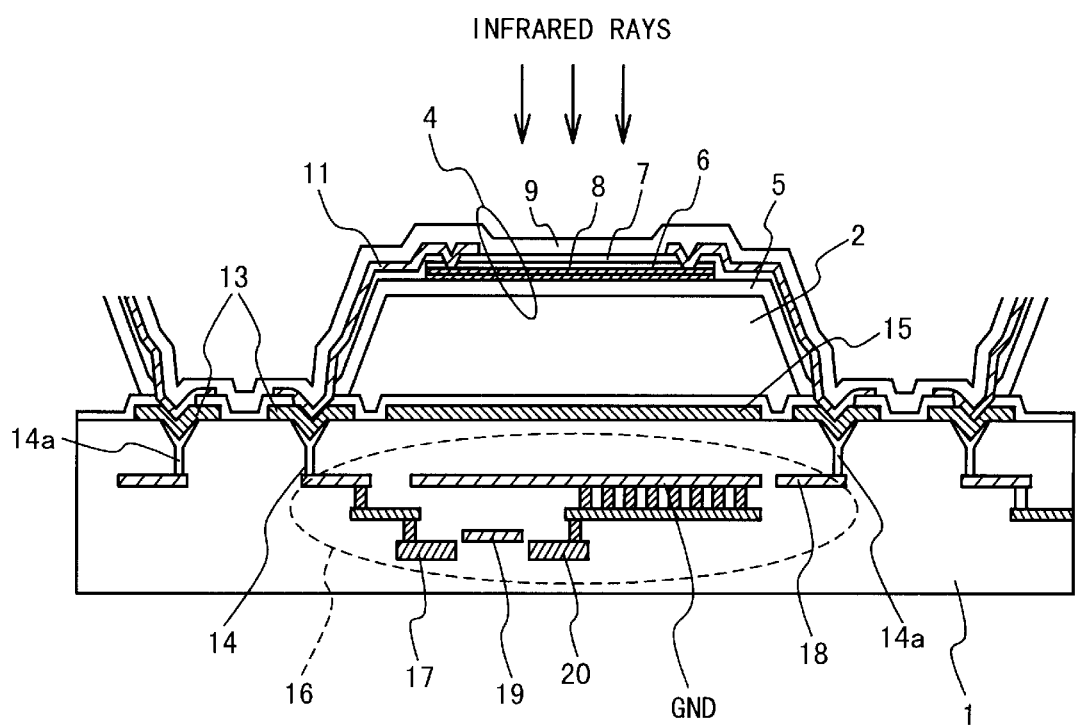
FIG. 9 is a cross sectional view of the thermal type infrared ray detector with the thermal separation structure in the first embodiment along a broken line X–Y in FIG. 8.

FIG. 8 shows the thermal type infrared ray detector with the thermal separation structure according to the first embodiment of the present invention. FIG. 9 is a cross sectional view of the thermal type infrared ray detector with the thermal separation structure in the first embodiment along a broken line X–Y in FIG. 8. Referring to FIG. 8, a bolometer type infrared ray detector array is shown as the thermal type infrared ray detector with the thermal separation structure in the first embodiment. A picture element structure of the bolometer type infrared ray detector is composed of a light receiving section 10 in a diaphragm 4.

The diaphragm 4 is supported by the two beams 3 to form an air gap 2 between the diaphragm 4 and a silicon substrate 1 with a readout circuit. The diaphragm 4 is composed of a silicon nitride SiN protective insulating film 5 with the thickness of 300 nm, and a bolometer material thin film 6 of VOx with the thickness of 160 nm formed on the SiN protective insulating film 5. A multiple film of a SiN protective insulating film 7 with the thickness of 50 nm and a silicon oxide protective insulating film 8 with the thickness of 60 nm is formed on the bolometer material thin film 6.

The wiring line 11 of the beam 3 from the light receiving section of a cell C1 and a drain 17 of a transistor of the cell C1 are connected to an Al wiring line in the silicon substrate 1 through a contact pad D1, 13 of an Al/TiN/Ti layer structure and a tungsten plug 14. The contact pad 13 may have a Ti/Al/TiN/Ti layer structure or a Ti single layer structure. Also, the wiring line 11 of the beam 3 from the light receiving section of the cell C1 is connected to a signal line 18 through a contact pad SIG1 13 of an Al/TiN/Ti layer structure and a tungsten plug 14a. The contact pad SIG1 13 may have the Ti/Al/TiN/Ti layer structure or a Ti single layer structure. Of course, the neighbor cell has the same structure.

A cell C2 is disposed in a diagonal direction of a cell C1 and a cell C3 is disposed in a direction opposite to the diagonal direction. The contact pad D1 of the drain, of the transistor of the cell C1 and the contact pad SIG2 of the signal line of the cell C2 are electrically insulated and are made unitary by the protective insulating film of SiN. Also, the contact pad SIG1 of the signal line of the cell C1 and the contact pad D3 of the drain of the cell C3 are electrically insulated and are made unitary by the protective insulating film of SiN. Thus, the increase of the fill factor and the improvement of the fitting strength between the beam and the silicon substrate can be achieved. In this way, by electrically insulating by the protective insulating film and mechanically unifying the contact pads of the cells which are adjacent to each other in the diagonal direction, a space between the pads can be made as small as possible. Also, the further increase of the fill factor and the improvement of the fitting strength between the beam and the substrate can be attained by unifying the pads.

The drain, gate, and source of the transistor and the ground line and the signal line extend in the substrate 1 directly beneath the light receiving section 4. This operates to increase the fill factor. The occupation percentage of the ground wiring line in the cell is beyond 90% to have the endurance to noise.

The wiring line 11 of the Ti alloy such as TiAl6V4 with the thickness of 100 nm is surrounded by the protective insulating films 5, 7 and 9 of the silicon nitride with the total thickness of 600 nm and the other protective insulating film 8. The wiring line 11 passes through the two beams 3. The bolometer material thin film 6 inside the diaphragm 4 is electrically connected with the readout circuit in the silicon substrate 1 by the above-mentioned contact pad 13 and the wiring line plug 14 of tungsten.

An infrared ray reflection film 15 of Ti with the thickness of 200 nm is formed on the surface the Si substrate 1 with the readout circuit. When the infrared rays are incident on the diaphragm 4, a part of the incident infrared rays is absorbed by the silicon nitride thin films 5, 7 and 9. The remaining part of the infrared rays passes through the silicon nitride thin films, is reflected by the infrared ray reflection film 15 in the direction toward the diaphragm 4, and is absorbed by the silicon nitride thin films 5, 7 and 9. The distance between the infrared ray reflection film 15 and the silicon nitride thin film 5 is set to be about 1.5 µm. This space 2 is filled with polyimide at first but is removed by oxygen plasma in an ashing process.

The size of the picture element of this embodiment is the square of 37 µm. The length and width of each of the silicon nitride protective insulating films 5, 7 and 9 of the beam 3 are 29 µm and 1.8 µm, respectively, and the total thickness is 0.6 µm. The length, width, and thickness of the wiring line 11 of TiAl6V4 alloy are 29 µm, 1 µm, 0.1 µm, respectively. In this case, the thermal conductance of the thermal separation structure of FIG. 8 and 9 is 0.1 µW/K (see the table 2), and is the same as the best value of 81% of 0.126 in case of NiCr in the conventional example. The responsivity or sensitivity is improved 1.24 times. Also, the high fill factor of 71% is realized through the structural unification of the contact pads 13 and the connection of the light receiving section 4 and the cell 16 of the readout circuit through the wiring line plugs 14 and 14a.

In the table 2 are shown the thermal conductance and the relative sensitivity when Ti alloy other than TiAl6V4 is used as the wiring line material. It could be understood from the table 2 that the better sensitivity can be obtained when these Ti alloys are used, compared with the conventional example when NiCr was used.

In this embodiment, the bolometer material thin film of VOx is used. However, another material can be used which has an effective resistance temperature coefficient. In the same way, TiAl6V4 is used as the Ti alloy for the wiring line material of the beam in the embodiment. However, when the other Ti alloy of the table 3 of FIG. 14 is used, responsivity is higher than the best sensitivity obtained in the conventional example when NiCr was used.

In the present invention, the electrodes of the light receiving section are electrically connected with the drain or collector of the transistor of the cell 16 of the readout circuit and a signal line 18 through the connection thin film, i.e., a wiring line material thin film 11, a contact pad 13, and a wiring line plug 14a of tungsten.

A gate or base 19 of the transistor of the cell 16 is a polysilicon wiring line in which phosphorus ions are diffused, and connected with a shift register or a decoder of the readout circuit. A source or emitter 20 is connected with the ground wiring line GND which occupies most of the cell. It should be noted that the arrangement of 3×3 should be originally drawn in FIG. 8 but only the cells disposed in a diagonal relation are shown for easy viewing of the drawing.

By arranging the wiring line directly below the light receiving section in this way, the fill factor can be more increased than the conventional example.

In this way, the contact pads of the cells provided diagonally and adjacently are electrically insulated and are mechanically made unitary. Therefore, a gap between the pads is made as small as possible, so that the fill factor is increased. Also, the unification of the pads allows the fitting strength between the beam and the substrate to be increased.

By adopting the above mentioned structure, the detector sensitivity improvement through the increase of the fill factor, and the thermal separation structure, especially, the improvement of the fitting strength between the beam and the Si substrate can be achieved.

In the above description, the conventional wiring line material and structure material and the thermal conductivity of the wiring line material used in the present invention are shown in the table 1 of FIG. 12. The calculating values of thermal conductance to the beam with a specific thermal separation structure, i.e., a specific size and the relative sensitivity of the infrared sensor are shown in the table 2 of FIG. 13. It could be understood from the tables that the wiring line material used in the conventional examples is not optimal. On the other hand, it could be understood that Ti alloy is more excellent than any material used in the conventional examples. Especially, TiAl6V4 is excellent in the maximum.

Figure 10:
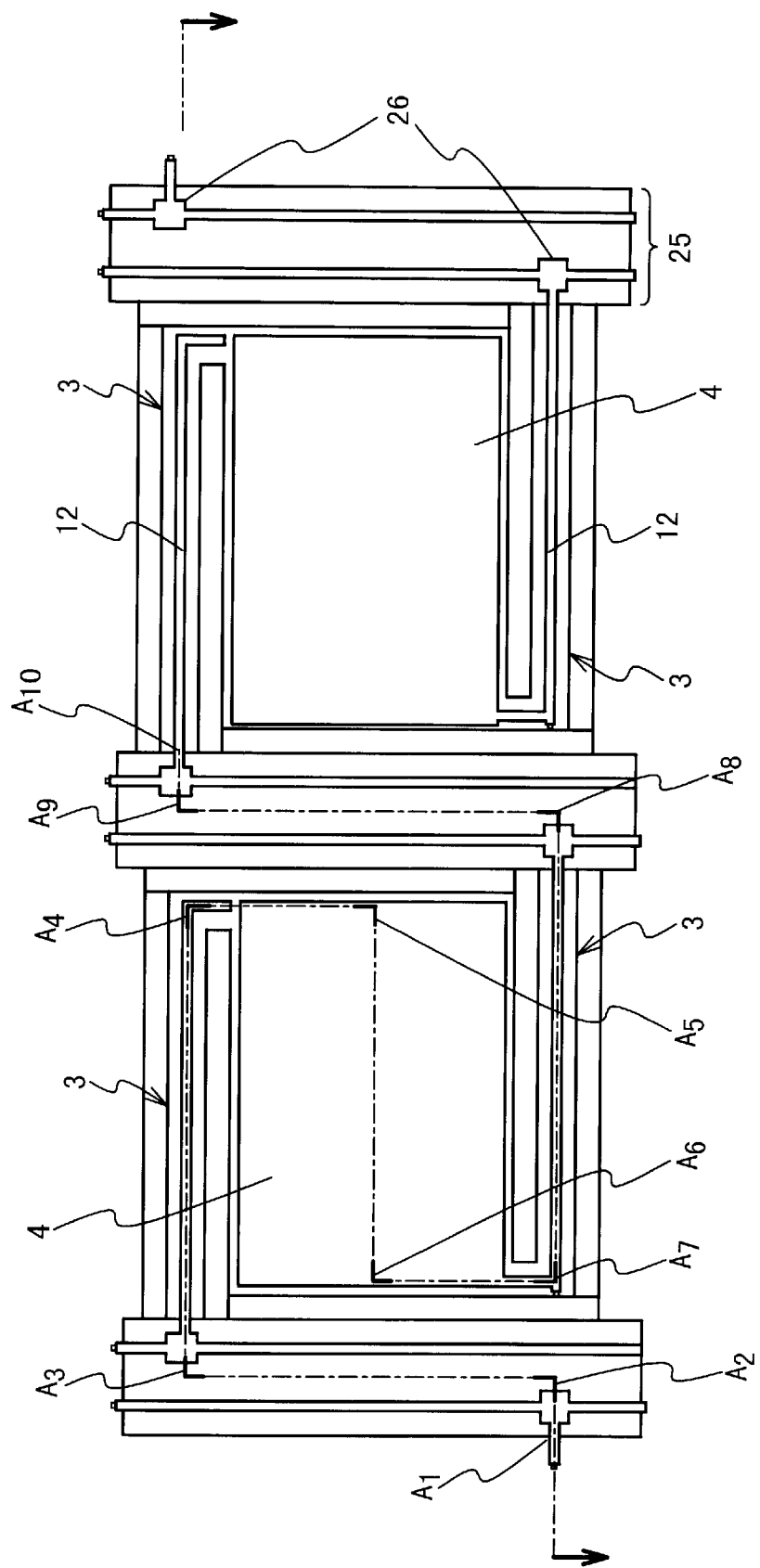
FIG. 10 is a plan view showing the thermal type infrared ray detector with the thermal separation structure according to a second embodiment of the present invention.
Figure 11:
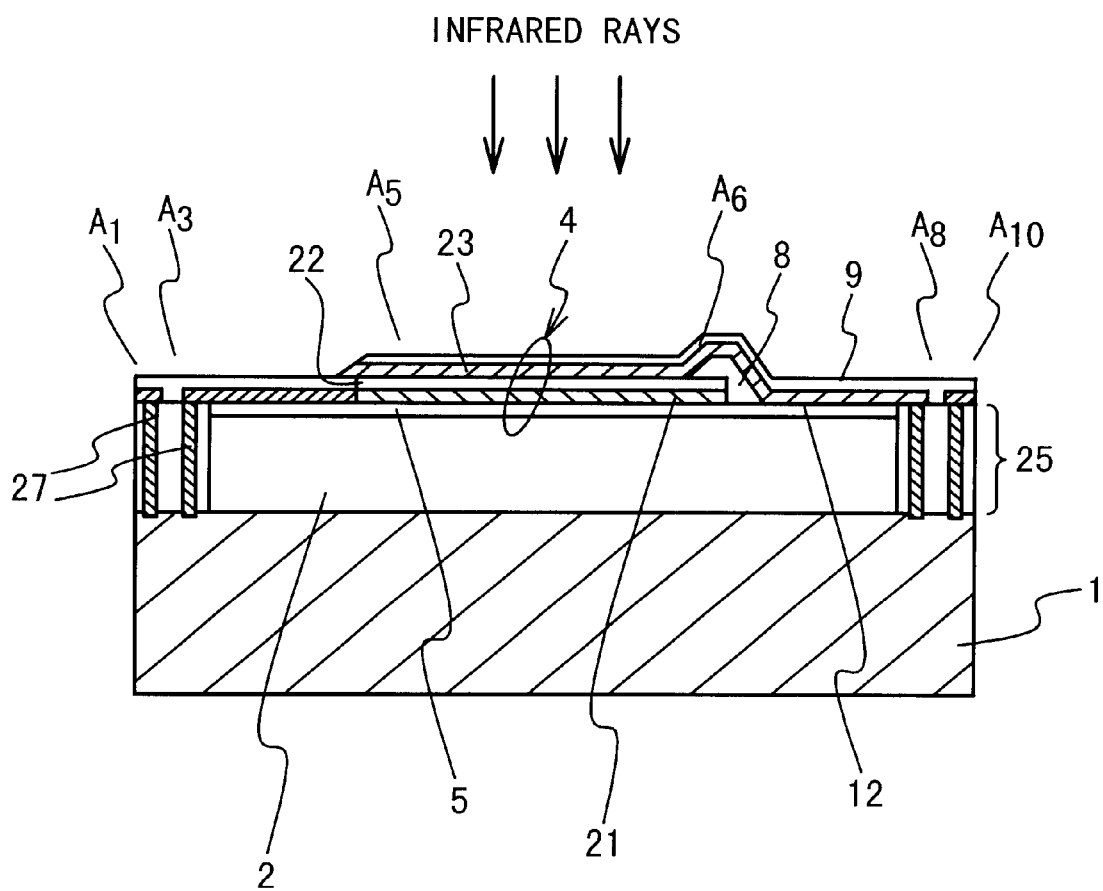
FIG. 11 is a cross sectional view the thermal type infrared ray detector with the thermal separation structure in the second embodiment along an A1–A10 line of FIG. 10.

FIGS. 10 and 11 show the thermal type infrared ray detector with thermal separation structure according to the second embodiment of the present invention. In the picture element structure of the ferroelectric type infrared ray detector, a diaphragm 4 is supported by two beams 3 to form an air gap 2 between the diaphragm 4 and the surface of a silicon substrate 1 with a readout circuit, as shown in FIGS. 10 and 11. The diaphragm 4 is composed of a lower electrode 21 as a multiple film composed of a Pt film with the thickness of 300 nm and a Ti alloy film of, for example, TiAl6V4 with the thickness of 100 nm. A ferroelectric film 22 of (Pb,La)(Zr,Ti)O$_3$ is formed on the lower electrode 21, and the upper electrode 23 of Ti alloy such as a TiAl6V4 thin film with the thickness of 100 nm formed on the ferroelectric film 22.

The two beams 3 and the diaphragm 4 are surrounded by protective insulating films 5, 8 and 9, which are formed of silicon nitride to have the total thickness of 600 nm. A wiring line 12 of Ti alloy such as a TiAl6V4 film with the thickness of 100 nm passes through the beam 3. The upper electrode 23 and the lower electrode 21 in the diaphragm 4 are connected with the readout circuit in the silicon substrate 1 by contacts 26 of a bank section 25 and wiring line plugs 27.

The thickness of the TiAl6V4 alloy film of the upper electrode 23 is adjusted to 5 nm which matches to a vacuum impedance of the sheet resistance of 377Ω. Thus, the, infrared rays incident on the diaphragm 4 can be effectively absorbed through the interference of the infrared rays between the upper electrode 23 and the lower electrode 21. On the other hand, the refractive index of (Pb,La)(Zr,Ti)O$_3$ to the infrared rays is about 2.4 (Hanson et al. (SPIE vol. 3379, 1998, p60)). Therefore, the thickness of the ferroelectric thin film between the upper electrode 23 and the lower electrode 21 is set to 1 μm (=λ/(4n)) (λ is a wavelength and 10 μm in this example, and n is the refractive index of the ferroelectric material).

The size of the picture element in the second embodiment is a 37-μm square. The length, width, and thickness of each of the silicon nitride protective insulating films 5 and 9 are 29 μm, 1.8 μm, and 0.3 μm, respectively. The silicon nitride protective insulating films 5 and 9 also are the components of the beams 3. The length, width, and thickness of the wiring line 12 of TiAl6V4 alloy are 29 μm, 1 μm, and 0.1 μm, respectively. In this case, the thermal conductance of the thermal separation structure of FIGS. 10 and 11 is 0.1 μW/K (see the table 2). Also, this value is 81% of the best value in case of NiCr in the conventional example. Thus, the responsivity or the sensitivity is improved 1.24 times. Also, like the above-mentioned embodiment, the high fill factor of 71% is realized.

The thermal conductance and the relative sensitivity when Ti alloy other than TiAl6V4 is used as the wiring line material are shown in the table 2. It could be seen from the table 2 that the sensitivity better than the best result in case of NiCr in the conventional example is obtained when these Ti alloys are used.

In the second embodiment, the ferroelectric thin film of (Pb,La)(Zr,Ti)O$_3$ is used. However, any material having the same effective pyroelectric coefficient can be used. Similarly, as the wiring line material of the beam 3, the responsivity higher than the best responsivity in case of NiCr in the conventional example can be obtained by using the other Ti alloy listed up in a table 3 in place of TiAl6V4.

The infrared rays are incident on the diaphragm (the light receiving section) 4 and are absorbed by the protective insulating film (see FIGS. 8 and 9). In addition, the infrared rays reflected to the direction of the diaphragm 4 by the reflection film 15 are absorbed by the protective insulating film to change the temperature of the diaphragm. The resistance of the bolometer thin film changes through this change, and the change of the resistance is converted into the voltage change by the readout circuit. Thus, an infrared picture is obtained. In this way, the radiation quantity of the infrared rays can be converted into the electric signal.

When $R_V(bol)$ is a direct voltage responsivity, α is a resistance temperature coefficient of the bolometer material, η is an infrared absorptivity, $V_B$ is a bias voltage, Gth is a thermal conductance of the thermal separation structure, f is a chopping frequency, and $\tau_T$ is a thermal time constant, the responsivity $R_V(bol)$ of the thermal type infrared sensor using a bolometer material thin film is shown in the following equation.

$$R_V(bol) = R_{V0}(bol) \frac{1}{\sqrt{1 + (2\pi f \tau_T)^2}} \quad [V/W]$$

$$R_{V0}(bol) = \frac{\alpha \eta V_B}{G_{th}}$$

In this way, the responsivity of the bolometer type infrared sensor is in inverse proportion to the thermal conductance. Therefore, the responsivity of the thermal type infrared sensor can be improved through the reduction of the thermal conductance.

In case of the ferroelectric type infrared sensor array (see FIG. 11), a part with a specific wavelength of the infrared rays incident on the diaphragm 4, infrared rays is absorbed through the interference to each other between the upper electrode 23 and the lower electrode 21. As a result, the temperature of the diaphragm changes. The surface electric charge quantity of the ferroelectric thin film changes in accordance with the temperature change and the change of the charge quantity is converted into a voltage change by the readout circuit. The radiation quantity of the infrared rays can be converted into the electric signal in this way.

When the effective pyroelectric coefficient is $\gamma$, the thickness of the ferroelectric thin film is d, the dielectric constant of the thin film is $\varepsilon$, the infrared absorptivity is $\eta$, and the thermal conductance of the thermal separation structure is Gth, the direct voltage responsivity RV0(ferro) of the pyroelectric type infrared sensor using a ferroelectric thin film is expressed by the following equation.

$$R_{V0}(ferro) = \frac{\eta \gamma d}{\varepsilon G_{th}} \quad [V/W]$$

The responsivity of the pyroelectric type infrared sensor is also in inverse proportion to the thermal conductance in this way. Therefore, responsivity of the pyroelectric type infrared sensor can be improved by the reduction of the thermal conductance.

In the thermal type infrared ray detector with the thermal separation structure of the present invention, Ti alloy with a smaller thermal conductivity than the conventional example is used as the wiring line material on the beam, the thermal conductance of the beam is reduced. Thus, the sensitivity of the thermal type infrared detector can be improved.

In the thermal type infrared ray detector with the thermal separation structure of the present invention, the contact pad of a picture element and the contact pad of another picture element diagonal to the picture element are made unitary in the structure and electrically insulated. Therefore, the fill factor is increased to improve the sensitivity of the detector, and to enhance the bonding strength between the beam and the substrate. Also, by using Ti alloy with a smaller thermal conductivity than the conventional example as the wiring line material on the beam, the thermal conductance of the beam can be reduced so that the sensitivity of the detector can be improved.

What is claimed is:

1. A thermal type infrared ray detector with a thermal separation structure comprising
   a circuit formed in a substrate for every picture element;
   a light receiving section converting infrared rays into change of a resistance or a charge quantity, and said circuit generates a voltage signal from said resistance change or said charge quantity change; and
   beams mechanically supporting said light receiving section from said substrate to form a gap between said light receiving section and said substrate, and electrically connecting said light receiving section to said circuit,
   wherein each of said beams includes:
      a wiring line film formed of Ti alloy and connecting said light receiving section to said circuit; and
      a protective insulating film surrounding said wiring line film,
   wherein said Ti alloy is TiAl6V4.

2. The thermal type infrared ray detector according to claim 1, wherein a signal line for transferring said voltage signal to said circuit and a ground line are formed in said substrate.

3. The thermal type infrared ray detector according to claim 1, further comprising:
   a reflecting film formed on said substrate to perfectly reflect said infrared ray which has passed through said light receiving section, toward said light receiving section.

4. The thermal type infrared ray detector according to claim 1, wherein said converting film includes a bolometer material film.

5. The thermal type infrared ray detector according to claim 4, wherein said light receiving section further includes a protective insulating film formed to cover said bolometer material film.

6. A thermal type infrared ray detector according to claim 1, wherein said light receiving section comprises:
   a lower electrode;
   a ferroelectric material thin film formed on said lower electrode; and
   an upper electrode formed on said ferroelectric material thin film.

7. The thermal type infrared ray detector according to claim 6, wherein said light receiving section further includes a protective insulating film formed to cover said upper electrode.

8. A thermal type infrared ray detector with a thermal separation structure comprising
   a plurality of picture elements, each of which comprises:
      a circuit formed in a substrate for every picture element;
      a light receiving section converting infrared rays into change of a resistance or a charge quantity and said circuit generates a voltage signal from said resistance change or said charge quantity change; and
      beams mechanically supporting said light receiving section from said substrate to form a gap between said light receiving section and said substrate, and electrically connecting said light receiving section to said circuit,
   wherein each of said beams includes:
      a wiring line film formed of Ti alloy and connecting said light receiving section to said circuit; and
      a protective insulating film surrounding said wiring line film, wherein
         said light receiving section is connected to said circuit via contact pads,
         said contact pad for a first of said plurality of picture elements and said contact pad of a second of said plurality of picture elements which is disposed in a diagonal direction from said first picture element are structurally unified and electrically insulated.

9. The thermal type infrared ray detector according to claim 8, wherein a signal line for transferring said voltage signal to said circuit and a ground line are formed in said substrate.

10. The thermal type infrared ray detector according to claim 8, further comprising:
    a reflecting film formed on said substrate to perfectly reflect said infrared ray which has passed through said light receiving section, toward said light receiving section.

11. The thermal type infrared ray detector according to claim 8, wherein said converting film includes a bolometer material film.

12. The thermal type infrared ray detector according to claim 11, wherein said light receiving section further includes a protective insulating film formed to cover said bolometer material film.

13. A thermal type infrared ray detector according to claim 8, wherein said light receiving section comprises:
   a lower electrode;
   a ferroelectric material thin film formed on said lower electrode; and
   an upper electrode formed on said ferroelectric material thin film.

14. The thermal type infrared ray detector according to claim 13, wherein said light receiving section further includes a protective insulating film formed to cover said upper electrode.

15. A thermal type infrared ray detector with a thermal separation structure comprising a plurality of picture elements, each of which comprises:
   a circuit formed in a substrate for every picture element;
   a light receiving section converting infrared rays into change of a resistance or a charge quantity, and said circuit generates a voltage signal from said resistance change or said charge quantity change; and
   beams mechanically supporting said light receiving section from said substrate to form a gap between said light receiving section and said substrate, and electrically connecting said light receiving section to said circuit,
   each of said beams includes:
      a wiring line film formed of Ti alloy and connecting said light receiving section to said circuit; and
      a protective insulating film surrounding said wiring line film, and
      a signal line for transferring said voltage signal to said circuit and a ground line are formed in said substrate, wherein said Ti alloy is TiAl6V4.

16. The thermal type infrared ray detector according to claim 15, further comprising:
   a reflecting film formed on said substrate to perfectly reflect said infrared ray which has passed through said light receiving section, toward said light receiving section.

17. The thermal type infrared ray detector according to claim 15, wherein said converting film includes a bolometer material film.

18. The thermal type infrared ray detector according to claim 17, wherein said light receiving section further includes a protective insulating film formed to cover said bolometer material film.

19. A thermal type infrared ray detector according to claim 15, wherein said light receiving section comprises:
   a lower electrode;
   a ferroelectric material thin film formed on said lower electrode; and
   an upper electrode formed on said ferroelectric material thin film.

20. The thermal type infrared ray detector according to claim 19, wherein said light receiving section further includes a protective insulating film formed to cover said upper electrode.

21. A thermal type infrared ray detector with a thermal separation structure comprising a plurality of picture elements, each of which comprises:
   a circuit formed in a substrate for every picture element;
   a light receiving section converting infrared rays into change of a resistance or a charge quantity, and said circuit generates a voltage signal from said resistance change or said charge quantity change; and
   beams mechanically supporting said light receiving section from said substrate to form a gap between said light receiving section and said substrate, and electrically connecting said light receiving section to said circuit,
   each of said beams includes:
      a wiring line film formed of Ti alloy and connecting said light receiving section to said circuit; and
      a protective insulating film surrounding said wiring line film, and a signal line for transferring said voltage signal to said circuit and a ground line are formed in said substrate, wherein said light receiving section is connected to said circuit via contact pads, said contact pad for a first of said plurality of picture elements and said contact pad of a second of said plurality of picture elements which is disposed in a diagonal direction from said first picture element are structurally unified and electrically insulated.

22. The thermal type infrared ray detector according to claim 21, further comprising:
   a reflecting film formed on said substrate to perfectly reflect said infrared ray which has passed through said light receiving section, toward said light receiving section.

23. The thermal type infrared ray detector according to claim 21, wherein said converting film includes a bolometer material film.

24. The thermal type infrared ray detector according to claim 23, wherein said light receiving section further includes a protective insulating film formed to cover said bolometer material film.

25. A thermal type infrared ray detector according to claim 24, wherein said light receiving section comprises:
   a lower electrode;
   a ferroelectric material thin film formed on said lower electrode; and
   an upper electrode formed on said ferroelectric material thin film.

26. The thermal type infrared ray detector according to claim 25, wherein said light receiving section further includes a protective insulating film formed to cover said upper electrode.

27. A thermal type infrared ray detector with a thermal separation structure comprising a plurality of picture elements, each of which comprises:
   a circuit formed in a substrate for every picture element;
   a light receiving section converting infrared rays into change of a resistance or a charge quantity, and said circuit generates a voltage signal from said resistance change or said charge quantity change; and
   beams mechanically supporting said light receiving section from said substrate to form a gap between said light receiving section and substrate, and electrically connecting said light receiving section to said circuit via contact pads,
   wherein each of said beams includes:
      a wiring line film formed of Ti alloy and connecting said light receiving section to said circuit; and
      a protective insulating film surrounding said wiring line film, and
   wherein said contact pad for a first of said plurality of picture elements and said contact pad of a second of said plurality of picture elements which is disposed in a diagonal direction from said first picture element are structurally unified and electrically insulated.

28. The thermal type infrared ray detector according to claim 27, wherein said Ti alloy is TiAl6V4.

29. The thermal type infrared ray detector according to claim 27, wherein a signal line for transferring said voltage signal to said circuit and a ground line are formed in said substrate.

30. The thermal type infrared ray detector according to claim 27, further comprising:
   a reflecting film formed on said substrate to perfectly reflect said infrared ray which has passed through said light receiving section, toward said light receiving section.

31. The thermal type infrared ray detector according to claim 27, wherein said converting film includes a bolometer material film.

32. The thermal type infrared ray detector according to claim 31, wherein said light receiving section further includes a protective insulating film formed to cover said bolometer material film.

33. A thermal type infrared ray detector according to claim 27, wherein said light receiving section comprises:
   a lower electrode;
   a ferroelectric material thin film formed on said lower electrode; and
   an upper electrode formed on said ferroelectric material thin film.

34. The thermal type infrared ray detector according to claim 33, wherein said light receiving section further includes a protective insulating film formed to cover said upper electrode.

* * * * *